US012590029B2

(12) United States Patent
Döberl

(10) Patent No.: US 12,590,029 B2
(45) Date of Patent: Mar. 31, 2026

(54) FILLING MATERIAL

(71) Applicant: Egon Döberl, Grünbach bei Freistadt (AT)

(72) Inventor: Egon Döberl, Grünbach bei Freistadt (AT)

( * ) Notice: Subject to any disclaimer, the term of this patent is extended or adjusted under 35 U.S.C. 154(b) by 329 days.

(21) Appl. No.: 18/276,479

(22) PCT Filed: Feb. 9, 2022

(86) PCT No.: PCT/AT2022/060039
§ 371 (c)(1),
(2) Date: Aug. 9, 2023

(87) PCT Pub. No.: WO2022/170376
PCT Pub. Date: Aug. 18, 2022

(65) Prior Publication Data
US 2024/0109810 A1 Apr. 4, 2024

(30) Foreign Application Priority Data

Feb. 10, 2021 (AT) ............................... A 50084/2021

(51) Int. Cl.
| | |
|---|---|
| *C04B 16/08* | (2006.01) |
| *C04B 7/02* | (2006.01) |
| *C04B 14/22* | (2006.01) |
| *C04B 28/04* | (2006.01) |
| *C04B 103/00* | (2006.01) |
| *C04B 111/00* | (2006.01) |
| *E21B 33/138* | (2006.01) |

(52) U.S. Cl.
CPC ................ *C04B 16/08* (2013.01); *C04B 7/02* (2013.01); *C04B 14/22* (2013.01); *C04B 28/04* (2013.01); *C04B 2103/0045* (2013.01); *C04B*

*2111/00663* (2013.01); *C04B 2111/00724* (2013.01); *C04B 2201/20* (2013.01); *E21B 33/138* (2013.01)

(58) Field of Classification Search
CPC ......... C04B 16/08; C04B 28/00; C04B 28/04; C04B 18/022; C04B 2201/20; C04B 32/02; C04B 40/0028; C04B 7/02; C04B 14/22; C04B 14/24; C04B 2201/32; C04B 2103/0045; C04B 2111/00663; C04B 2111/00724
See application file for complete search history.

(56) References Cited

FOREIGN PATENT DOCUMENTS

| | | |
|---|---|---|
| AT | 407526 B | 4/2001 |
| DE | 1983295 A1 | 1/2000 |
| DE | 19844722 A1 | 3/2000 |
| WO | 2018039750 A1 | 3/2018 |

OTHER PUBLICATIONS

English translation of AT 407526. (Year: 2001).*
International Search Report and Written Opinion in International Application No. PCT/AT2022/060039, mailed Jun. 23, 2022, 15 pages.

* cited by examiner

*Primary Examiner* — Zakiya W Bates
(74) *Attorney, Agent, or Firm* — Liang & Hennessey LLP; Brian Hennessey

(57) ABSTRACT

A dry mix of a thermally insulating fill material for back-filling and/or filling. The fill material includes a cement-based binder and a thermally insulating material, and the thermally insulating material is newly foamed monograin polystyrene beads.

17 Claims, 1 Drawing Sheet

FILLING MATERIAL

CROSS-REFERENCE TO RELATED APPLICATIONS

The present application is a national phase application of PCT Application No. PCT/AT2022/060039, filed Feb. 9, 2022, entitled "FILLING MATERIAL", which claims the benefit of Austrian Patent Application No. A 50084/2021, filed Feb. 10, 2021, each of which is incorporated by reference in its entirety.

BACKGROUND OF THE INVENTION

1. Field of the Invention

The invention relates to a heat-insulating fill material for backfilling or filling.

2. Description of the Related Art

A backfill or filling with heat-insulating fill material is generally used to fill cavities and can be installed as floor insulation or as insulation behind walls. A backfill is often used to enclose a pool placed in a dug pit (or other depression, e.g. in an indoor pool) on the sides, i.e. to fill the gap between the pool and the pit wall (or another wall, e.g. the wall of a building) up to a certain height. A reinforced concrete ring anchor is usually placed on top of the backfill.

The base plate of the pool can be filled with thermally insulating fill material, which usually has a different composition than the backfill, in order to meet the requirements for compressive strength.

When backfilling pools in the form of one-piece pools, gravel or polystyrene concrete has been used instead of lean concrete for years.

The advantage is the heat-insulating effect and thus the "warm keeping" of the bathing water in the pool.

So far, only or at least mostly recycled regrind has been used as an insulating aggregate for lightweight concrete.

The heat of hydration during the setting of the binder, which mainly consists of cement, results in high temperatures, especially in voluminous backfill spaces, since the heat of hydration can only escape poorly through the dense mortar matrix.

For example, a core temperature of approx. 80-90 degrees C. can occur on a summer's day. This can lead to damage to pipes and fittings made of plastic as well as the outside wall of the pool. Of course, this problem also occurs with other fillings or backfills if the fill material is introduced in a large quantity, in particular in a large layer thickness, and temperature-sensitive elements are present in the fill material or are in contact with it. An example of this is vault backfilling. An additional problem is that the polystyrene regrind can also shrink at these high temperatures, so that the supporting effect is greatly reduced due to the resulting cavities.

SUMMARY OF THE INVENTION

The object on which the invention is based is to provide an improved heat-insulating fill material for backfilling or filling.

For the solution, a thermally insulating fill material for backfilling or filling is proposed.

The thermally insulating fill material according to the invention comprises a cement-based binder and a thermally insulating material, the thermally insulating material being newly foamed monograin polystyrene beads.

The newly foamed monograin polystyrene beads are expanded polystyrene spheres or expanded polystyrene beads, or the newly foamed monograin polystyrene beads can also be referred to as newly expanded monograin polystyrene beads.

Processes for the production of expanded polystyrene beads are known in the prior art. The starting material is hard, bead-shaped polystyrene granules, which are impregnated with a blowing agent during production, which blowing agent evaporates through the supply of heat during prefoaming. In this manner, the compact polystyrene beads expand by 20 to 50 times of their volume to be expanded polystyrene beads.

The polystyrene beads used in the present invention are therefore hollow spheres.

Newly foamed (or expanded) means that the polystyrene beads are produced as such and are not obtained by recycling, in particular by crushing polystyrene elements. When shredding old polystyrene to form a recyclate, a large proportion of small particles and dust are produced. As a result, a significantly higher proportion of binder and water is required.

Monograin means that the polystyrene beads are in the form of individual spheres or beads. The polystyrene beads are available as loose bulk material.

By using newly foamed monograin polystyrene beads, the specific surface area to be bonded or wetted is reduced and thus the required amount of binder is reduced.

Since the heat of hydration depends on the binder content, this already reduces the temperature.

The mono grain also creates a sphere packing with spaces between them, through which heat can be better escape. The fill material according to the invention heats up less during curing and cools down more quickly.

As a result, the core temperature can be reduced by up to 40 degrees Celsius even in voluminous filling or backfilling areas.

As a result, there is no damage to temperature-sensitive built-in parts.

Another advantage is that the round shape of the aggregate ensures fast, automatic distribution of the fill material when filling with compressed air. As a result, shape-sensitive constructions can also be quickly filled or backfilled without great effort and without additional safety measures. This creates significantly less pressure on sensitive built-in parts, since the friction of the polystyrene beads is significantly lower than with ground polystyrene.

A harmful uneven distribution of the binder in the material matrix, which can occur when using ground old polystyrene as insulating material, can also be greatly minimized in this way.

A homogeneous, uniform mixed matrix is obtained.

The fill material preferably contains polystyrene beads which have a specific weight of 8-40 kg/m$^3$, preferably 12-18 kg/m$^3$. The average grain size is preferably 2-12 mm, preferably 3-5 mm. In other words, the diameter of the polystyrene beads is preferably in the range of 2-12 mm, preferably 3-5 mm.

The proportion of polystyrene beads in the fill material is preferably between 8 and 40 kg/m$^3$, preferably between 12 and 18 kg/m$^3$.

The binder content of the fill material is preferably between 20-125 kg/m$^3$, preferably 45-85 kg/m$^3$. Preferably the cement is a Portland cement, in particular a high-quality Portland cement. CEM I 52,5R is preferred.

The binder can contain additives (concrete additives).

To increase the specific surface area, 0.5-10%, preferably 1-3%, amorphous silica (in powder form or liquid) can be added.

The fresh mortar bulk density of the fill material is preferably between 70 and 150 kg/m³.

The dry bulk density of the fill material is preferably between 60 and 135 kg/m³.

The fill material preferably contains no aggregate.

The formulation of the fill material mixed for the introduction (in particular by compressed air delivery) preferably has the following composition:

Cement: 20 to 125 kg/m³, preferably 45 to 85 kg/m³

Polystyrene beads: 8 to 40 kg/m³, preferably 12 to 18 kg/m³

Water: 10 to 50 l/m³, preferably 18 to 35 l/m³.

The polystyrene beads have a diameter in the range of 2-12 mm, preferably 3-5 mm.

Concrete admixtures and/or additives can be added to the water or the stirred mixture.

The mixture to be introduced into the space to be filled is in a semi-dry state (earth-moist state). The mixture is therefore conditionally free-flowing (since the round spheres are only wetted with binders, they have a low level of friction, so that they distribute well or can be distributed well because they roll against each other) and must be distributed and lightly pressed on when introduced. Due to the semi-dry (earth-moist) application of the mixture, spaces with air also remain between the polystyrene beads wetted with moist binder. These free spaces are not closed, but are connected, so that air channels are present in the material, through which the heat of the curing process can be easily dissipated. In other words, the freshly introduced mixture is open-cell porous. This can be explained by the fact that the proportion of binder is low, so that there is only a thin layer of binder on the polystyrene beads. The polystyrene beads are thus not enclosed in a binder matrix, as is the case with liquid or pasty mortar, foam concrete and/or concrete with thermally insulating particles. In the present invention, the binder is present at least at the points of contact of the polystyrene beads. To distinguish it from foam or aerated concrete, it should be noted that the mixture in question does not contain any foam components or air-entraining agents; in addition, the air pores of foam or aerated concrete are closed-cell.

The amount of water added is preferably between 1.8 and 3.5 liters per 100 liters of dry mix, in particular between 2 and 3 liters per 100 liters of dry mix.

The fill material in question is preferably used for filling or backfilling when there are heat-sensitive elements in the space to be filled, or when heat-sensitive elements adjoin the space to be filled, in particular if the space is voluminous. The fill material in question is preferably used to fill spaces whose thickness (expansion in the direction with the smallest dimension) is at least 10 cm, in particular at least 15 cm. In the case of floor fillings, the height of the filling is to be regarded as the thickness; in the case of backfilling, the extent perpendicular to the area to be backfilled. The fill material is particularly preferably used for backfilling pool walls.

When using the fill material for the construction of a bottom slab of pools, it is preferred that this has a 10-30% higher binder content than the backfilling of the pool, due to the higher requirement for compressive strength.

Another preferred use is the backfilling of vaults.

When using the fill material, it may be necessary to cover the fill material after it has been inserted to protect it from drying out too quickly (e.g. due to exposure to the sun).

According to the invention, an air-permeable, perforated or breathable material such as an air-permeable film or tarpaulin is used for this purpose so that the heat dissipation on the surface of the filling is not impeded by the covering.

The invention includes a method for backfilling and/or soil filling using the heat-insulating fill material according to the invention, this being mixed with water to form a semi-dry (earth-moist) mixture and being introduced into the space to be filled or backfilled, the fill material being present in the space with a sphere packing structure, air being present in the interstices of the polystyrene beads wetted with binder.

On the construction site, i.e. when using the fill material in question, the semi-dry (earth-moist) consistency can be tested by forming the mixture into a ball ("snowball test"). The right consistency is reached when the mixture retains the spherical shape and only disintegrates when a finger presses down on the ball. The mixture should have a slight sheen on the surface. If the ball falls apart immediately after forming, the consistency is too dry and the mixture cannot be compacted sufficiently. If the consistency is too wet, the ball will no longer hold its shape after forming and will have a film of cement paste on the surface.

The invention also encompasses a backfill or ground fill constructed with the heat-insulating fill material according to the invention, this being in the form of a sphere packing structure, with air being present in the interstices of the polystyrene beads connected by the binder.

The sphere packing structure is open-cell.

Warm air can preferably rise within the sphere packing structure, in particular escape from its surface.

Preferably, the surface of the sphere packing structure is sealed with a subsequently applied layer of another material (for example concrete or screed) after it has hardened.

BRIEF DESCRIPTION OF THE DRAWINGS

For a schematic illustration of the structure of the applied fill material, the following drawings are attached.

DETAILED DESCRIPTION

Figure 1:
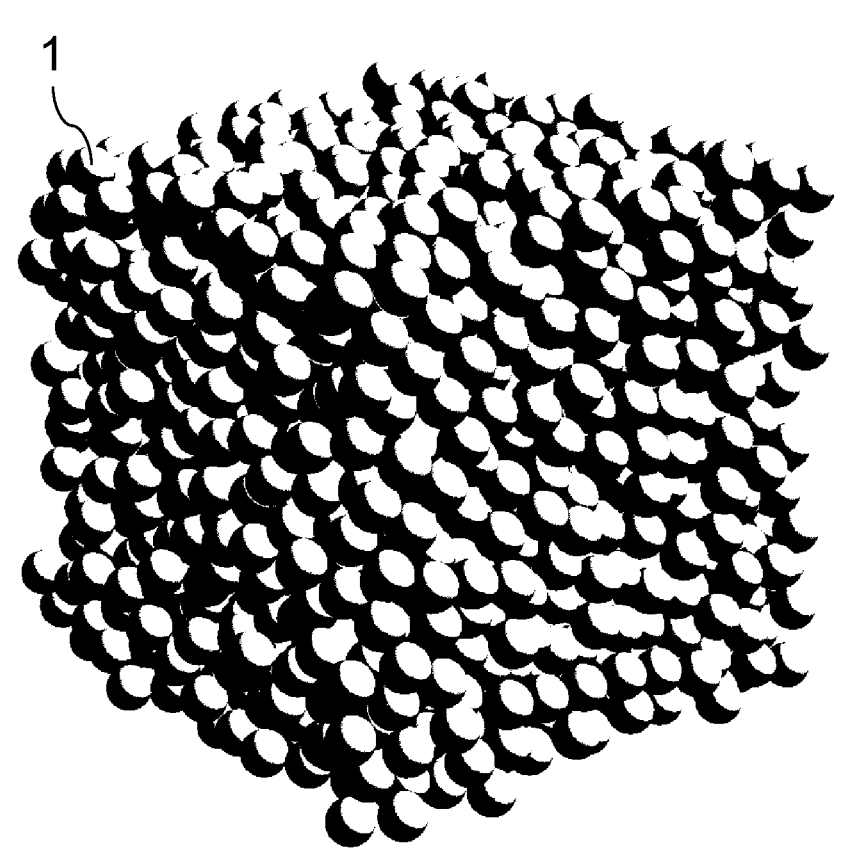
FIG. 1: Schematically illustrates the lattice structure of the applied fill material in a 3D view.

As illustrated in FIG. 1, the spheres 1 of the fill material wetted with binder form a packing of spheres with a random arrangement (irregular packing) of the wetted spheres 1. Intermediate spaces remain between the wetted spheres 1, which spaces are connected to one another.

During curing, heated air can rise in the interstices within the sphere packing and escape on its surface.

After the filling or backfilling has hardened, a layer of another material is usually applied to it, which closes or seals the surface of the filling or backfilling. When backfilling a pool, this is done using the reinforced concrete ring anchor. The pool floor plate is covered by the pool itself.

Figure 2:
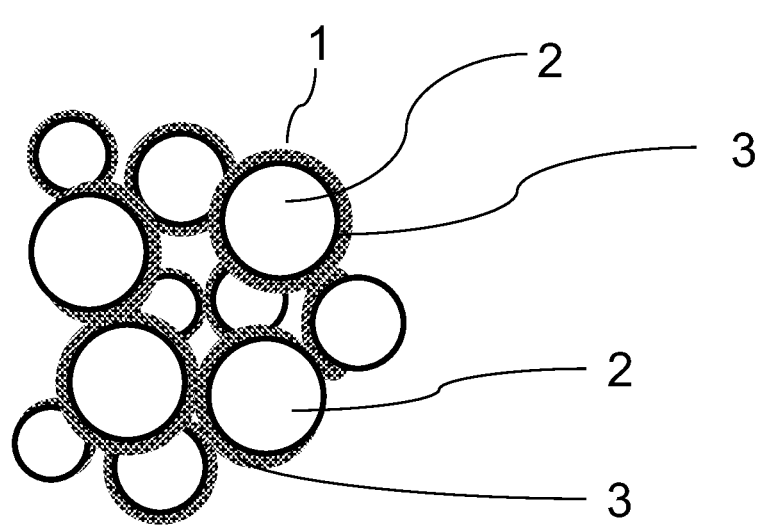
FIG. 2: Schematically illustrates the lattice structure of the applied fill material with a section through the binder adhering to the respective sphere.

In FIG. 2 a few wetted spheres 1 of the sphere packing are shown. The monograin spheres 2 made of polystyrene can have a more or less pronounced binder coating 3. The binder coating 3 can enclose the mono-grain spheres 2 or be present only partially on them, in particular in the contact area of the mono-grain spheres 2.

However, a complete coating of the monograin spheres 2 with binder is preferred.

A dye is preferably added to the binder. Complete wetting or thorough mixing can be visually recognized from the color contrast of the colored binder to the preferably white polystyrene beads. After the binder has hardened, the sphere packing structure is retained, with the polystyrene beads being connected to one another by the hardened binder, air being present in the interstices of the polystyrene beads connected by the binder.

The invention claimed is:

1. A dry mix of a thermally insulating fill material for at least one of backfilling and filling, the fill material comprising:
   a cement-based binder; and
   a thermally insulating material;
   wherein the thermally insulating material is newly manufactured foamed monograin polystyrene beads, recycled polystyrene beads not being used; and
   wherein the fill material is an earth-moist mixture, the earth-moist mixture existing when the fill material can be formed into a sphere that retains a spherical shape and only disintegrates when pressed from above.

2. A dry mix according to claim 1, wherein an average size of the polystyrene beads is in a range of 2-12 mm.

3. A dry mix according to claim 2, wherein the average size of the polystyrene beads is in a further range of 3-5 mm.

4. A dry mix according to claim 1, wherein a density of the polystyrene beads is in a range of 8-40 kg/m$^3$.

5. A dry mix according to claim 4, wherein the density of the polystyrene beads is in a further range of 12-18 kg/m$^3$.

6. A dry mix according to claim 1, wherein an amount of the binder amount is between 20 and 125 kg/m$^3$.

7. A dry mix according to claim 6, wherein the amount of the binder amount is between 45 to 85 kg/m$^3$.

8. A dry mix according to claim 1, wherein the binder comprises Portland cement.

9. A dry mix according to claim 1, wherein the binder comprises amorphous silica as an additive.

10. A dry mix according to claim 1, wherein the fill material contains no foam component and no air-entraining agents.

11. A method for at least one of backfilling and filling using a dry mixture of a heat-insulating fill material, comprising:
   mixing the dry mixture with water to form a semi-dry mixture, the dry mixture comprising a cement-based binder and a thermally insulating material comprising newly manufactured foamed monograin polystyrene beads, recycled polystyrene beads not being used; and
introducing the semi-dry mixture into a space to be one of filled and backfilled;
wherein the fill material in the space is present with a sphere packing structure, with the polystyrene beads being binder-wetted and air is present in interstices of the polystyrene beads; and
wherein the fill material is an earth-moist mixture, the earth-moist mixture existing when the fill material can be formed into a sphere that retains a spherical shape and only disintegrates when pressed from above.

12. The method according to claim 11, further comprising covering a surface of the one of the backfill and the fill with one of an air-permeable material and a breathable material after the introducing operation.

13. The method according to claim 12, wherein the one of the air permeable material and the breathable material is one of a tarpaulin and a foil.

14. The method according to claim 11, wherein the fill material contains no foam component and no air-entraining agents.

15. A backfill or fill made according to a method, the method comprising:
   mixing a dry mixture of a heat-insulating fill material with water to form a semi-dry mixture, the dry mixture comprising a cement-based binder and a thermally insulating material comprising newly manufactured foamed monograin polystyrene beads, recycled polystyrene beads not being used; and
   introducing the semi-dry mixture into a space to be one of filled and backfilled;
   wherein the fill material in the space is present with a sphere packing structure, with the polystyrene beads being bonded by the binder and air is present in interstices of the polystyrene beads; and
   wherein the fill material is an earth-moist mixture, the earth-moist mixture existing when the fill material can be formed into a sphere that retains a spherical shape and only disintegrates when pressed from above.

16. The backfill or fill according to claim 15, wherein the sphere packing structure is open-celled.

17. The backfill or fill according to claim 15, wherein the fill material contains no foam component and no air-entraining agents.

* * * * *